Figure 1:
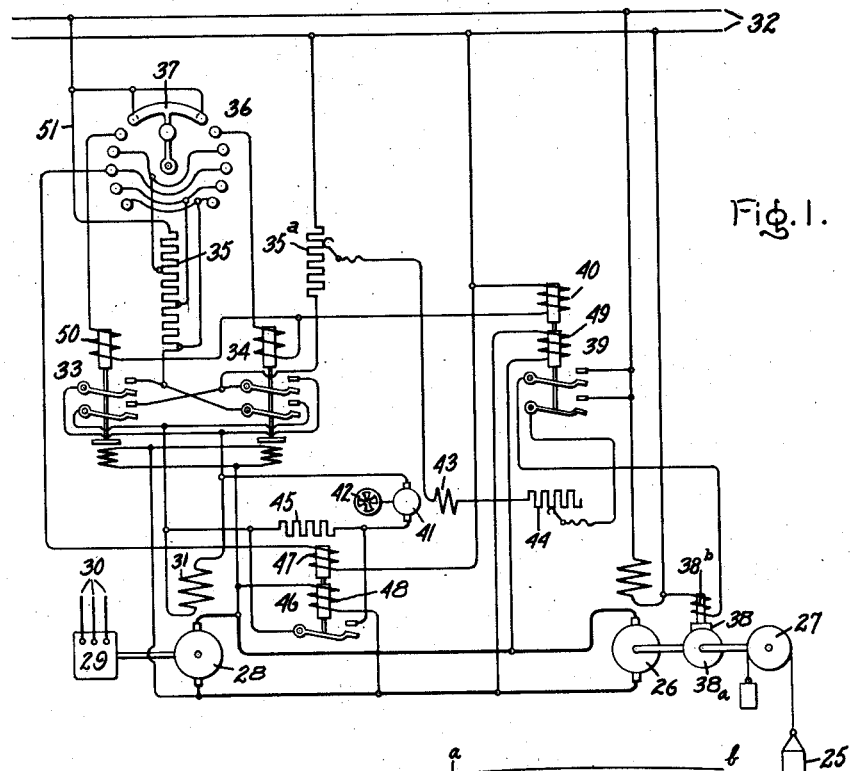

Jan. 5, 1932.        M. A. WHITING         1,840,145
ELECTRIC CONTROL SYSTEM
Filed Jan. 21, 1930

Inventor:
Max A. Whiting,
by Charles E. Tullar
His Attorney.

Patented Jan. 5, 1932

1,840,145

UNITED STATES PATENT OFFICE

MAX A. WHITING, OF SCHENECTADY, NEW YORK, ASSIGNOR TO GENERAL ELECTRIC COMPANY, A CORPORATION OF NEW YORK

ELECTRIC CONTROL SYSTEM

Application filed January 21, 1930. Serial No. 422,460.

This invention relates to electric control systems, more particularly to control systems for the field windings of dynamo electric machines and the like; and has for an object the provision of a simple, reliable and inexpensive means for positively controlling the rates of rise and decay of the magnetism of an electromagnet.

Another object of the invention is the provision of a simple and dependable means whereby the rates of rise and decay of magnetism in electromagnets are readily reduced to lower values than are obtainable solely due to the inductive characteristics of the electromagnet itself.

A further object of this invention is the provision of a simple, dependable and adjustable means whereby the maximum rate of change of magnetism of an electromagnet due to a change of exciting circuit conditions is attained gradually and not abruptly at the instant of circuit change.

More specifically my invention relates to Ward Leonard systems, i. e., systems in which the operations of an electric motor are controlled responsively to variations in the excitation and voltage of the generator from which it is supplied. In the operation of Ward Leonard systems it is very frequently desirable both during the accelerating and decelerating periods of the motor to prevent the rate of change of speed of the motor from exceeding a maximum permissible value and to provide that this maximum rate of change of speed shall be attained somewhat gradually. Furthermore it is desirable that the means employed to attain these results should be simple in order not to require experience or undue caution on the part of the operator in the manipulation of the controller nor the employment of complicated concatenations of electromagnetic devices and the like for automatically controlling the generator excitation.

It is difficult and often impracticable to design the magnetic circuit of the generator of a Ward Leonard system sufficiently inductive to produce the low maximum permissible rates of generator field that are necessary to prevent the rates of acceleration and deceleration of the driving motor from exceeding predetermined maximum permissible values. This is particularly true of the Ward Leonard systems in which the machines are of relatively small capacity such for example, as in Ward Leonard systems employed for driving electric passenger elevators and the like in which the maximum permissible rates of acceleration and retardation of the hoisting motor should be limited to moderate values in order to prevent undue discomfort to the passengers and abuse of the apparatus itself.

Consequently a further object of my invention is the provision of a Ward Leonard system in which simple and dependable means are provided for limiting the rates of rise and decay of magnetism of the generator to the moderate values necessary to produce the moderate maximum permissible rates of acceleration that are required in the operation of elevators and the like.

In carrying my invention into effect in one form thereof I control the rate of variation of the magnetism of an electromagnet by means of a separately excited auxiliary dynamo electric machine provided with a kinetic energy storing device and having its armature connected to the exciting winding of the electromagnet.

In another aspect of my invention I control the rate of variation of the magnetism of an electric generator—for example the generator of a Ward Leonard system, by connecting the armature of the auxiliary dynamo electric machine to the field winding of the generator.

In illustrating my invention in one form thereof I have shown it as embodied in a simple rudimentary system for controlling the rate of variation of magnetism of an electromagnet and broadly useful for various control purposes; and the invention is also illustrated as employed in an elevator system, the auxiliary dynamo electric machine having the energy storing device being connected to the field winding of the generator of a Ward Leonard system from which the hoisting motor is supplied.

Figure 2:
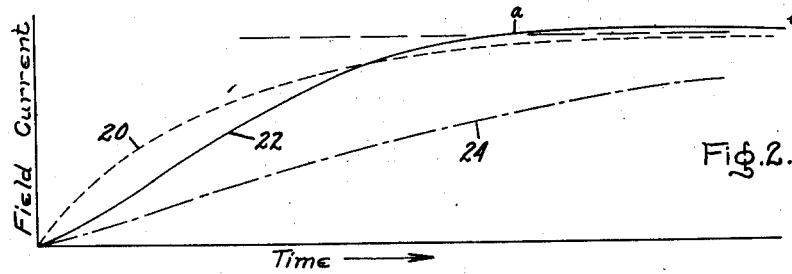
Figure 3:
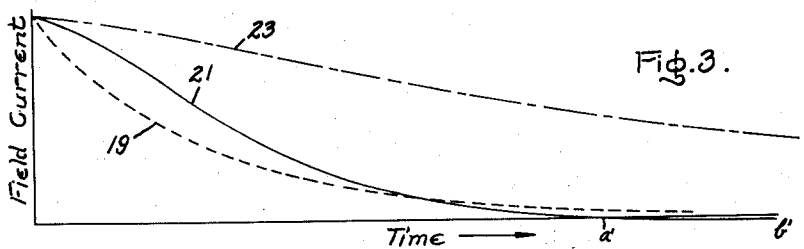
Figure 4:
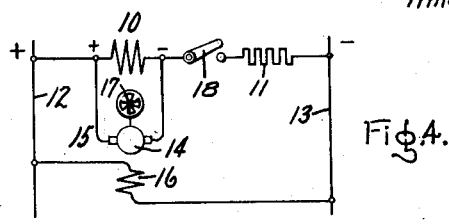

For a better and more complete understanding of the invention, reference should now be made to the following specification and to the accompanying drawings in which Fig. 1 is a simplified diagrammatical representation of a system of elevator control embodying my invention, Figs. 2 and 3 are characteristic curves respectively illustrating the rise and decay of exciting current or magnetism of an electromagnet under various conditions and Fig. 4 is an elementary diagram in simplified form of an excitation control system embodying my invention.

Referring now to the rudimentary form of the invention shown in Fig. 4 an exciting winding 10 for an electromagnet is supplied from a suitable source of excitation such as that represented by the conductors 12 and 13. The winding 10 is designed to be fully excited at substantially less than the exciting bus voltage and the difference is absorbed in resistor 11 which is connected in series therewith. In parallel with the winding 10 is connected the armature 14 of a small direct current motor 15, the resistance of the armature being small compared with that of the winding 10, preferably not more than approximately 10%. The motor 15 is provided with a field winding 16 which is separately excited from the exciting bus 12, 13. The motor 15 is also provided with a suitable energy storing device such for example as the flywheel 17, which as shown is mounted upon the shaft of the motor so as to rotate therewith. In order to obtain the desired moderating effect upon the rates of rise and decay of magnetism in the winding 10, the flywheel 17 is preferably so designed that its stored energy at the maximum steady state condition of the field winding 10 is roughly once and a half the energy stored magnetically in the field winding. I have found that if the maximum energy storing capacity of the motor 15 and its flywheel 17 is less than a certain predetermined critical current value, current oscillations occur in the winding 10. The motor 15 should also be so designed that its running light current is relatively very small in comparison with the normal maximum current of the electromagnet winding 10.

With respect to the decay of exciting current and magnetism of the winding 10, the operation is as follows: The switch 18 having been previously closed for a sufficient period of time the current I in the winding 10 and the speed of the motor 15 are at their normal maximum values. Assuming the polarity of the left hand exciting bus 12 to be positive, the direction of the current in winding 10 is from left to right and the direction of the running light current in the motor 15 is also from left to right. The left hand brush of the motor 15 is, therefore, of positive polarity. The opening of the switch 18 results in the establishment of an undivided discharge circuit through the armature 14 of the motor.

The exciting current of the winding 10 tends to be maintained not only by the action of its own self-induced counter E. M. F. but also by the counter E. M. F. of the motor 15 which is now driven as a generator by the kinetic energy stored in its own armature and flywheel. As a result it serves in large measure to control the rate of change of excitation of the winding 10 during the period of decay and prolongs the decay very substantially in comparison with that which would be provided solely by the electromagnetic stored energy of the winding 10.

The running light current of the motor 15 and the resistance of its armature 14 being very small the initial counter E. M. F. of the motor 15 at the instant of opening the switch 18 is practically equal to the IR drop of the field winding 10. Hence the self-induced voltage of the winding 10 is very small at this instant and as a result the initial rate of decay of its exciting current is very small. It will thus be seen that the kinetic stored energy of the motor 15 and its flywheel 17 supplies most of the energy of excitation during the initial part of the decay. As the motor 15 slows down its counter E. M. F. decays quite rapidly thus permitting the rate of decay of the exciting current of winding 10 to increase. This, however, causes the self-induced voltage of the winding 10 to increase which in turn acts to restrict the rate of decay of magnetism of the winding 10 so that it is less than proportional to the decay of the counter E. M. F. of the motor 15.

The total effect then is that the decay of the field winding 10 begins at a very moderate rate, rises quite gradually to a maximum rate and then gradually diminishes to lower rates of decay as the transient approaches completion.

The operation with respect to the rise of excitation of the winding 10 is similar. Switch 18 having been opened for a sufficient period of time, the speed of the motor 15 is zero and the excitation current of the winding 10 and the current in armature 14 are zero. The operation of the switch 18 to the closed position causes a potential to be applied to the terminals of the winding 10 and the armature 14 of the motor which potential is initially very low due to the large IR drop in the resistor 11. At the first instant after the closure of the switch 18, winding 10 is substantially short circuited by the armature 14 of the motor and since the voltage impressed on the winding is low the initial rate of rise of current in the winding 10 is also low. The field winding 16 of the motor 15 is excited to its normal value and as a result of this the motor 15 begins to accelerate at a comparatively rapid rate and as its counter E. M. F. rises the voltage across the terminals of the winding 10 rises accordingly. Thereafter the rate of rise of the current in winding 10 increases. However, as the counter E. M. F. of the motor 15 and the current in the winding 10 increase the rate of acceleration of the motor 15 decreases and as a result its counter E. M. F. rises more slowly. Thereafter as the current in the winding 10 continues to rise the excess of voltage applied to its terminals over its IR drop becomes less (due to the decrease in the acceleration of the motor 15) so that the rate of rise of current in the winding 10 gradually decreases from the maximum rate as the change approaches completion.

It will thus be observed from the above described cooperation of the resistor 11 with the motor 15 in limiting the electromotive force initially applied to the winding 10 and in controlling its subsequent rate of increase together with its consequent effect upon the rise of excitation of the winding, that the provision of the resistor 11 in circuit with the winding 10 is an important feature of the invention.

The decay of exciting current and consequently of magnetism of the winding 10 is expressed mathematically by the following differential equation:

$$(1) \quad \frac{d^2I}{dt^2} + \frac{R_1+R_3}{L}\frac{dI}{dt} + kI = 0$$

in which $I$ = the instantaneous value of the current in winding 10
$R_1$ = ohmic resistance of winding 10
$R_3$ = armature resistance of motor 15
$L$ = the coefficient of self induction of the winding 10
$k = \frac{em^2}{2W}$ where $e_m$ is the steady state maximum counter E. M. F. of motor 15.
$W$ = the steady state maximum kinetic energy stored in the motor 15 and its flywheel 17.

The solution of the differential Equation 1 may be written in the following form:

$$(2) \quad I = C_1 e^{m_1 t} + C_2 e^{m_2 t}$$

in which $e$ is the base of the Naperian system of logarithms and $C_1$ and $C_2$ are constants of integration, the values of which may be ascertained from a knowledge of certain boundary conditions of the equation and in which $$m_1 = -\frac{R_1+R_3}{2L} + \sqrt{\left(\frac{R_1+R_3}{2L}\right)^2 - \frac{k}{L}}$$

$$m_2 = -\frac{R_1+R_3}{2L} - \sqrt{\left(\frac{R_1+R_3}{2L}\right)^2 - \frac{k}{L}}$$

When W is large enough so that the term $\frac{k}{L}$ is smaller than term $$\left(\frac{R_1+R_3}{2L}\right)^2$$

then the values of $m_1$ and $m_2$ will both be real and negative. Those versed in the theory of transient phenomena will recognize that this represents a non-oscillating condition, i. e., one in which the current I does not reverse momentarily after decaying to zero.

On the other hand when the kinetic stored energy W of the motor 15 and its flywheel is so small that the term $$\frac{k}{L}$$

is larger than the term $$\left(\frac{R_1+R_3}{2L}\right)^2$$

then the radical terms in the constants $m_1$ and $m_2$ are complex which indicates a condition of damped oscillations, that is one in which the current I passes through zero, attains a negative value, again passes through zero to attain a similar positive value etc., in a series of oscillations of ever diminishing magnitude. Under this condition the solution of the differential Equation (1) may by means of a well known mathematical transformation be written in the following form:

$$(3) \quad I = e^{-\left(\frac{R_1+R_3}{2L}\right)t} [C_3 \cos p_1 t + C_4 \sin p_1 t]$$

in which $$p_1 = \sqrt{\frac{k}{L} - \left(\frac{R_1+R_3}{2L}\right)^2}$$

The mathematical equations for the rise of exciting current and magnetism of the winding 10 are in general similar to those just given for the decay but they are slightly more complicated due to the fact that the resistor 11 is included in the circuit with the winding 10 and the armature 14 when the switch 18 is closed to excite the winding 10. Because of the general similarity of the equations for both conditions, the equations for the rise are not given since persons skilled in the mathematical art will be able to set up the equations and obtain their solutions from the explanation of the equations given for the decay.

However, it may be said in general that when W, i. e., the maximum kinetic stored energy of the motor 15 and the flywheel 17 is greater than a certain critical value the rise in the exciting current and magnetism of the winding 10 is non-oscillating, i. e., the current does not rise beyond the steady state maximum, whilst when W is less than this critical value there is present a condition of oscillations, i. e., the current of the winding 10 after attaining its normal maximum value rises beyond this value and then decreases below the normal maximum etc., in a series of oscillations of ever diminishing magnitude.

Thus it will be seen that the phenomenon of oscillation or non-oscillation is analogous to that for the decay. It may be said, however, that slightly more stored energy in the flywheel 17 is required to prevent oscillations for the rise of magnetism than is required for the decay. In practice, however, this difference is so small that it may be disregarded since if the flywheel is properly designed for the decay it will also serve satisfactorily for the rise.

For the decay the critical value of kinetic energy stored in the flywheel 17 that is necessary to prevent oscillations in the exciting current may be determined from the equation 2 and is given by the following equation:

$$(4) \quad W = \frac{2\, e_m I_m R_1 L}{(R_1 + R_3)^2}$$

in which $I_m$ is the steady state maximum value of the current I. In general the value of W given by this equation is approximately four times the energy stored magnetically in the winding 10. Although the condition of severe oscillations is to be avoided, it has been found in practice that the oscillations of exciting current are of only negligible magnitude at values of W very substantially less than the mathematically critical value given by equation 4.

The above described theoretical conditions will be understood more clearly by reference to Figs. 2 and 3 in which curves have been plotted between exciting current as ordinates and time as abscissæ; the curves of Fig. 2 showing the rise of exciting current and magnetism of the winding 10 under certain conditions and the curves of Fig. 3 showing the decay of exciting current and magnetism of winding 10 under similar conditions.

Referring now to Figs. 2 and 3 the curves 19 and 20 represent respectively the natural or inherent decay and rise of field current and magnetism in the winding 10, it being assumed in the curve 20 of Fig. 2 that the motor 15 and the resistor 11 are omitted and the exciting bus voltage reduced to correspond with the omission of the resistor 11. These two curves thus represent the slowest possible rates of decay and rise of magnetism of the winding 10 which can be obtained in that specific winding without the employment of some modifying means. The curve 21 represents the decay of magnetism in the winding 10 obtained when the motor 15 is employed and the resistance of its armature 14 is approximately 10% of that of the winding 10 and W (the kinetic stored energy of the motor 15 and its flywheel at normal full speed) is only 30% of the critical value given by the equation (4) above.

Curve 22 of Fig. 2 shows the rise of magnetism in the winding 10 for the same values of stored energy of the motor 15 and its flywheel 17.

The curve 23 of Fig. 3 shows the decay of magnetism for the winding 10 when the value of the stored energy W of the motor 15 and its flywheel 17 is very slightly greater than the mathematically critical value given by equation (4) and similarly the curve 24 of Fig. 2 shows the rise of magnetism of the winding 10 under the same conditions. It will be observed from a study of the curves 21 and 22 that although the stored energy of the motor 15 and its flywheel 17 is only 30% of the mathematical critical value necessary to prevent oscillations, that in the rise the first oscillation (which is the greatest) represented by the portion $a-b$ above the normal maximum value of the curve 22 carries the excitation current I to a momentary maximum value only about 3% above the normal value. For the decay the first oscillation represented by the portion $a'-b'$ below the zero line carries the current I to a momentary negative value only about 1% of the normal maximum. In practice oscillations of these small magnitudes are of negligible effect.

The effect readily obtainable by my invention during the decay of magnetism in the winding 10 is clearly shown by the comparison of the curves 21 and 23 with the curve 19. It will be observed from the curve 19 which represents the natural decay of magnetism of the winding 10 without the aid of any modifying means that the decay is initiated at a very high rate, and that this rate remains fairly steep during the early part of the decay and thereafter gradually diminishes with the lapse of time after the opening of the switch 18. On the other hand in the curves 21 and 23 which represent decay of magnetism of the winding 10 as modified by the employment of the motor 15 provided with a flywheel 17 having different values of stored energy, the decay of the winding 10 is initiated at a very gradual rate and the maximum rate of decay is gradually approached. It will furthermore, be observed that the maximum rates of decay as represented by the curves 21 and 23 are not as steep as the maximum rate of decay represented by the curve 19. The above observations as to the initiation of changes in the magnetism of winding 10 and the maximum rates thereof also apply in Fig. 2 to the curves 22 and 24 as compared with the curve 20.

By increasing the stored energy of the motor 15 and the flywheel 17, the rate at which rise or decay in magnetism in the winding 10 is initiated as well as the maximum rates of rise or decay can be made as small as desired.

Referring now to the practical embodiment of my invention shown in Fig. 1 an elevator car 25 is raised and lowered by means of a motor 26 which has a suitable driving connection with the traction sheave 27 about which the car supporting cables are wound. This motor is electrically connected in a Ward Leonard system to a generator 28 which is driven by a suitable driving motor 29 shown as a three-phase alternating current motor supplied from a suitable source represented in the drawing by the three supply lines 30.

The voltage of the generator is varied to control the speed of the motor 26 by varying the excitation of the generator field winding 31. The field winding 31 is energized from a suitable substantially constant direct current source of supply 32, suitable electromagnetic reversing switches or contactors 33 and 34 and a variable resistance 35 and a permanent resistor 35a being included in the connections. A multi-position controller 36 having a movable contact segment 37 serves to control the operation of the reversing contactors 33 and 34 and the variable speed governing resistance 35.

The motor 26 is brought to rest by means of a solenoid brake 38 which is normally pressed against the brake drum 38a by any suitable means such for example as a spring not shown. A control relay 39, having an energizing winding 40 which is controlled in response to operation of the manually operated controller 36, serves when operated to its closed position to energize the solenoid winding 38b of the brake and thereby withdraw the brake shoe 38 from the brake drum 38a against the tension of its spring.

The armature of a small electric motor 41 is connected in parallel with the field winding 31 of the generator 28; the motor 41 being provided with a suitable energy storing device such as that represented by the flywheel 42 which is mounted upon the shaft of the motor so as to rotate therewith. As shown in the drawings, the motor 41 is provided with a field winding 43 which is separately excited from the direct current source of supply 32, one of its terminals being connected to an intermediate point of the resistance 35a which is connected to one side of the supply source 32 and the other of its terminals being connected to the opposite side of the supply source 32 in series with an adjustable resistor 44 and the lower contact of the control relay 39. The resistance 44 is made adjustable for the purpose of adjusting the speed of the motor 41 so that the energy stored in the flywheel 42 which is driven by the motor can be adjusted over a wide range of desired values.

In the operation of an elevator several reduced speeds are provided. When the flywheel 42 and the motor 41 are suitably chosen and adjusted to provide the desired prolongation of the periods of rise and decay of the generator field 31 for an acceleration from rest to full speed and the converse retardation, the response of the field when maneuvering, for example to land the elevator car at a floor, may be inconvenienced by excessive sluggishness of the generator field in response to operation of the master switch between the central of off position of the controller segment 37 and a first or second speed position. Accordingly I provide the resistance 45 controlled by the control relay 46 for modifying the effect of the motor 41 upon the field 31 of the generator when the master switch is in a low speed or off position and the current of the field winding 31 is at a low or zero value. The relay 46 is provided with an energizing winding 47 the excitation of which is controlled by the master switch 36 and this winding is energized from the direct current supply source 32 beyond a certain master switch position in either direction, and as shown, beyond the second speed position.

The relay 46 is also provided with a second winding 48 which is energized by the terminal voltage of the generator 28 and once this relay has been picked up this winding serves to maintain the contacts of the relay 46 closed until the terminal voltage of the generator 28 has decreased to a certain small percentage of its normal value after the master switch 36 has been operated to its central or off position.

It will also be observed that the control relay 39 is provided with a second winding 49 which is energized by the terminal voltage of the generator 28; the purpose of this winding being to maintain the contacts of the relay 39 closed once they have been picked up until the terminal voltage of the generator 28 has diminished to a certain predetermined percentage of its normal value after the master switch has been returned to the off position.

With the above understanding of the elements and their organization with respect to each other in the system, the operation of the system itself and the effect of the motor 41 and its flywheel 42 upon the operation of the system will readily be understood from the description which follows. With the apparatus in the position shown in the drawings the system will be at rest. It will be assumed that the adjustment of resistance 44 has been chosen so as to adjust the excitation of the motor 41, that the maximum stored energy of the motor and its flywheel 42 at maximum speed of the motor 41 is just sufficient to produce the desired rates of rise and decay of the generator field 31 when the voltage impressed upon the circuit of the motor field 43 is less than the bus voltage by the IR drop of a section of the permanent resistor 35a.

In the usual operation, the system is started from rest by quickly advancing the movable control segment 37 from its central position to the final speed position in either direction (depending upon whether it is desired to cause the elevator to ascend or descend). Assuming that operation of the control segment in a counter clockwise direction effects an upward movement of the car, operation of the control segments 37 to its first speed position in a counter-clockwise direction connects the winding 50 of the up-directional contactor 33 to the direct current supply source 32 in series with the winding 40 of the control relay 39, as a result of which both the contactor 33 and the control relay 39 are operated to the closed position. The closing of the directional contactor 33 serves to connect the field winding 31 of the generator 28 to the direct current supply source 32 in series with the full amount of variable resistance 35 and the permanent resistor 35a, the circuit being traced from the upper supply conductor 32 by way of conductor 51 through the resistance 35, the upper contact of the directional contactor 33, through the field winding 31, the lower contact of the contactor 33, and thence through the resistance 35a to the lower side of the supply source 32. Simultaneously therewith, the closing of the lower contact of the relay 39 connects the filed winding 43 to the supply source 32 in series with the variable resistance 44 and a portion of the permanent resistor 35a. The upper contact of the relay 39 in closing connects the solenoid winding 38b of the brake to the supply source 32 thereby energizing the winding and retracting the brake shoe 38 from engagement with the brake drum 38a.

In the second position of the control segment 37 a portion of the variable resistance 35 is short circuited thereby increasing the voltage applied to the field winding 31 of the generator, whilst in the third position of the control segment the energizing winding 47 of the control relay 46 is energized across the supply source 32 over a circuit that may readily be traced. Control relay 46 in responding to the energization of its coil 47 closes its contact and short circuits the resistance 45 and thereby connects the armature terminals of the motor 41 directly across the terminals of the field winding 31 of the generator.

By advancing the control segment of the master switch to its fifth and final position the remaining sections of the variable resistor 35 are short circuited and the normal exciting voltage is applied to the field winding 31 of the generator.

Although the above operations have been described as taking place in a certain sequence it will be understood by persons skilled in the art that when the control segment 37 is advanced rapidly from its central or off position to its final position that the above described operations take place practically simultaneously. Thus except for the action of the motor 41 the full excitation voltage would be applied practically instantaneously.

The connection of the field winding 43 of the motor 41 to an intermediate point on the resistor 35a is a feature of my invention which produces certain desired and useful effects both during the rise and decay of magnetizing currents in the field winding 31 of the generator. At the first instant after the control segment 37 of the master switch has been advanced to the final speed position of the master controller, the current in rush through the resistor 35a and the armature of the motor 41 will be substantially greater than the normal maximum current of the generator field 31. As the generator field rises the total current in the resistor 35a (being the sum of the currents of the generator field and the motor armature) will for a time remain greater than the normal maximum. Thus the excitation of the motor 41 as affected by the IR drop of a portion of the resistance 35a will be decreased for a time below normal. As a consequence the rate of acceleration of the motor 41 will begin at a slower rate than would otherwise occur and as the acceleration proceeds the field of the motor 41 will gradually attain its normal strength (due to the decrease of the current in the resistance 35a as the counter E. M. F. of the motor 41 builds up). Thus it will be clear that the rate of rise of generator field current at the instant that the control segment 37 is moved to the final speed position is very substantially less than would be the case under a uniform excitation of the motor 41.

Thereafter the rate of rise of excitation of the generator field will increase gradually to its maximum and then taper off as full excitation is approached, in the manner above explained in connection with the rise of magnetism of the winding 10 of Fig. 4. Since the speed of the motor 26 which drives the elevator car 25 closely follows the excitation of the field winding 31 of the generator from which it is supplied, it will accelerate in a smooth and gradual manner similar to the rise of excitation of the generator field. As a result the elevator car 25 will be accelerated from rest in a smooth and gradual manner with a minimum amount of discomfort to the passengers.

The stopping operation is similar to the starting operation; the segment 37 of the controller being immediately retarded from the final speed position to the central or off position to deenergize the winding 50 of the directional contactor 33, the winding 47 of the control relay 36 and the winding 40 of the control relay 39. The contacts of the relays 46 and 39 remain in the closed position due to the energization of the windings 48 and 49 which are connected across the terminals of the generator. As a result of this the brake shoe 38 is held off the brake drum 38a and the resistance 45 remains short circuited, thereby permitting the motor 41 to exert its full effect in controlling the decay of energization of the field of the generator and consequently the deceleration of the driving motor 26.

The effect of the connection of the field winding 43 of the motor 41 to an intermediate point of the resistor 35a during the decay of the generator field 31 is as follows: When the control segment 37 is retarded to its central or off position the normal generator field current no longer traverses the resistor 35a and accordingly the excitation of the motor 41 increases. Thus at the beginning of the decay of the generator field the counter E. M. F. of the motor 41 increases somewhat so that the initial rate of decay of the generator field is less than would otherwise be the case. By properly choosing the point on the resistor 35a to which the field winding 43 of the motor 41 is connected, it is thereby possible to increase the counter E. M. F. of the motor during the beginning of the retardation by an amount substantially equal to the IR drop of its armature. Thus it is possible to cause the decay of the generator field to begin at practically a zero rate which of course results in initiating the deceleration of the driving motor 26 and the elevator car 25 at the same slow rate. From the point of view of avoiding discomfort to the passengers in the car 25 this initiation of the deceleration at an extremely low rate is ideal.

Thereafter, the excitation of the generator 28 and the speed of the motor 26 both decay smoothly and gradually toward zero in the manner described for the decay of the excitation of the winding 10 of Fig. 1. When the voltage at the terminals of the generator 28 reaches a predetermined low value the excitation of the winding 48 and 49 of the control relays 46 and 39 it is no longer sufficient to maintain these relays closed and as a result their contacts drop to the open position. Relay 39 in opening its contacts interrupts the energizing winding 38b of the brake and thereby permits its spring to set the brake shoe 38 against the brake drum 38a to complete the deceleration of the motor 26, and simultaneously interrupts the field winding 43 of the motor 41. The opening of the contact of the relay 46 removes the short circuit about the resistor 45 so that the armature of the motor 41 no longer closely short circuits the generator field winding 31.

In the event that the car 25 is not brought to rest level with the desired landing it may be maneuvered at low speed by advancing the segment 37 of the controller to the first low speed position either in a clockwise or a counter-clockwise direction, depending upon the direction of movement desired, and as a result the brake shoe 38 will be withdrawn from engagement with the brake drum 38a and the proper directional contactors 33 or 34 will be closed to effect the desired movement. Since the winding 47 of the control relay 46 is not energized in the first or second positions of the master switch it will not be picked up and the resistance 45 will be in circuit between the armature of the motor 41 and the generator field winding 31. As a result of this the motor 41 is unable to exert its normal prolonging effect and accordingly the response of the generator field is more prompt than would be the case if the resistor 45 were short circuited.

Although the operation of the motor 41 to control the decay and rise of magnetism of generator field 31 and the speed of the motor 26 has only been described for the operation of the master switch 36 from the off to the full speed position and from the full speed position to the off position, it will be understood that the motor 41 affects the same operations in a like manner when the control segment 37 is moved from rest to any intermediate position beyond the third and likewise when moved from the final speed position to an intermediate position to decelerate the motor.

Although in accordance with the provision of the patent statutes I have described my invention as embodied in specific apparatus, I would have it understood that the apparatus and connections shown in the drawings are merely illustrative and that the invention is by no means limited thereto since modifications and alterations will readily suggest themselves to persons skilled in the art without departing from the true spirit of the invention or the scope of the annexed claims.

What I claim as new and desire to secure by Letters Patent of the United States is:

1. A dynamo electric machine provided with means for exciting the same and separate means including a separately excited dynamo electric machine provided with a kinetic energy storing device for controlling the rate of variation of excitation of said first mentioned machine responsively to variation of the kinetic stored energy of said device.

2. In combination a dynamo electric machine provided with a field winding, means including a source of power and connections between said source and said winding for exciting said winding, means for establishing and interrupting said connections, and means including a separately excited dynamo electric machine having its armature connected to said winding and provided with a kinetic energy storing device for controlling the rate of rise and decay of excitation of said winding upon establishment and interruption of said connections.

3. In combination, an inductive winding, means for exciting said winding, and means including a resistance device permanently connected in circuit with said winding during the rise of excitation of said winding and a dynamo electric machine provided with a kinetic energy storing device and having its armature connected to said winding for controlling the rate of rise of excitation of said winding.

4. In combination an inductive winding, connections between said winding and a source of excitation, a current limiting device permanently connected in circuit with said winding during the rise of excitation of said winding, means for establishing and interrupting said connections, and means including a dynamo electric machine having its armature connected to said winding and provided with an energy storing device for cooperating with said current limiting device to prolong the period of rise of excitation of said winding.

5. In combination, a dynamo electric machine provided with a field winding for exciting the same, a resistance device permanently connected in circuit with said winding during the rise in excitation thereof, and means including a dynamo electric machine having its armature connected to said winding and provided with a kinetic energy storage device for controlling the rate of rise of excitation of said first mentioned dynamo electric machine.

6. In combination, a generator provided with means including a field winding for exciting the same, and means connected to said exciting means and including a kinetic energy storing device for decreasing the rate of change of excitation of said generator below the rate of change determined solely by the inductance of said winding.

7. In combination, a generator provided with a field winding, means for connecting said winding to a source of excitation, and means including a dynamo electric machine having its armature connected to said winding and provided with a flywheel for controlling the rate of rise and decay of excitation of said generator.

8. A control system comprising an inductive winding, means including connections to a source of excitation for exciting said winding a current limiting device permanently connected in circuit with said winding during the rise of excitation thereof, energy storing means including a dynamo electric machine having its armature connected to said winding and having a flywheel mechanically connected therewith for cooperating with said current limiting device to limit the rate of rise of excitation of said winding, and means for adjusting the maximum energy stored in said energy storing means.

9. In a control system, a magnet winding, connections including a resistance device between said winding and a source of excitation, means for establishing and interrupting said connections and means including a separately excited dynamo electric machine having the armature connected to said winding and one terminal of its field winding fixedly connected to an intermediate point of said resistance for limiting the rates of rise and decay of excitation of said winding upon establishment and interruption respectively of said connections.

10. A control system comprising a dynamo electric machine provided with an exciting winding, connections between said winding and a source of excitation, means for establishing and interrupting said connections, means including an auxiliary dynamo electric machine having its armature connected to said winding and provided with an energy storing device for controlling the rate of variation of excitation of said first mentioned dynamo electric machine, and means responsive to establishment of said connections for rendering said rate controlling means active, and responsive to an operating condition of said first mentioned dynamo electric machine for rendering said rate controlling means inactive.

11. In a control system the combination with an inductive winding of means including a controller and a current limiting device controlled thereby for controlling the energization of said winding, means including an energy storage device connected to said winding for controlling the rate of rise and decay of the energization of said winding, means for modifying the operation of said rate controlling means, and means responsive to an operation of said controller for rendering said modifying means inactive.

12. In combination an inductive winding, means including a multiposition controller and a current limiting device controlled thereby for controlling the energization of said winding, means including a dynamo electric machine provided with a flywheel and connected to said winding for controlling the rate of variation of energization of said winding, a resistance device normally in circuit with said dynamo electric machine for modifying the action of said rate controlling means, and means responsive to operation of said controller to one of its positions for rendering said modifying means inactive.

13. A motor control system comprising a motor, a supply generator therefor provided with a field winding and means for varying the excitation of said generator to vary the speed of said motor, and means comprising an auxiliary dynamo-electric machine connected to said winding and having a kinetic energy storing device for controlling the rate of variation of excitation of said generator and the rate of change of speed of said motor.

14. A system for controlling the operation of motor-driven apparatus comprising a motor for driving said apparatus in opposite directions, a variable voltage generator therefor provided with a field winding, connections between said winding and a source of power, means for establishing and interrupting said connections, and means including a dynamo electric machine having its armature connected to said winding and having a kinetic energy storing device for limiting the rate of change of excitation of said generator and the rate of change of speed of said motor upon establishment and interruption of said connections.

15. A system for controlling the operations of electric elevators and the like comprising a motor for raising and lowering the car, a supply generator therefor provided with a field winding, means including a resistance in circuit with said winding and a switching device for varying said resistance for varying the excitation of said generator and speed of said motor, and means including a dynamo electric machine having its armature connected to said winding and provided with a kinetic energy storing device for decreasing the rate of change of excitation of said generator below the value determined solely by the inductance of said winding.

16. In a system for controlling the operation of electric elevators and the like, a motor for raising and lowering a car, a supply generator therefor provided with a field winding, connections including a resistance device between said winding and a source of excitation, means including a multiposition speed governing controller for varying said resistance to vary the speed of said motor, means including switching devices controlled by said controller for establishing and interrupting said connections, means including a dynamo electric machine having its armature connected to said winding for limiting the rate of change of speed of said motor upon establishment and interruption of said connections, means operable in low speed positions of said controller to modify the action of said rate of change limiting means, and means responsive to operation of said controller to a high speed position for rendering said modifying means inactive.

17. In an elevator control system a motor for hoisting and lowering a car, a supply generator therefor provided with a field winding, connections including a resistance between said winding and a source of excitation, means for interrupting said connections, means including a dynamo electric machine having its armature connected to said winding and provided with an energy storing device for limiting the rate of deceleration of said motor upon interruption of said connections, and means including a separately excited field winding for said dynamo electric machine connected to an intermediate point of said resistance for increasing the counter electromotive force of said dynamo electric machine to substantially the value of the potential drop of said generator field winding and thereby effect initiation of deceleration of said motor at substantially zero rate.

In witness whereof, I have hereunto set my hand this 20th day of January, 1930.

MAX A. WHITING.